UNITED STATES PATENT OFFICE.

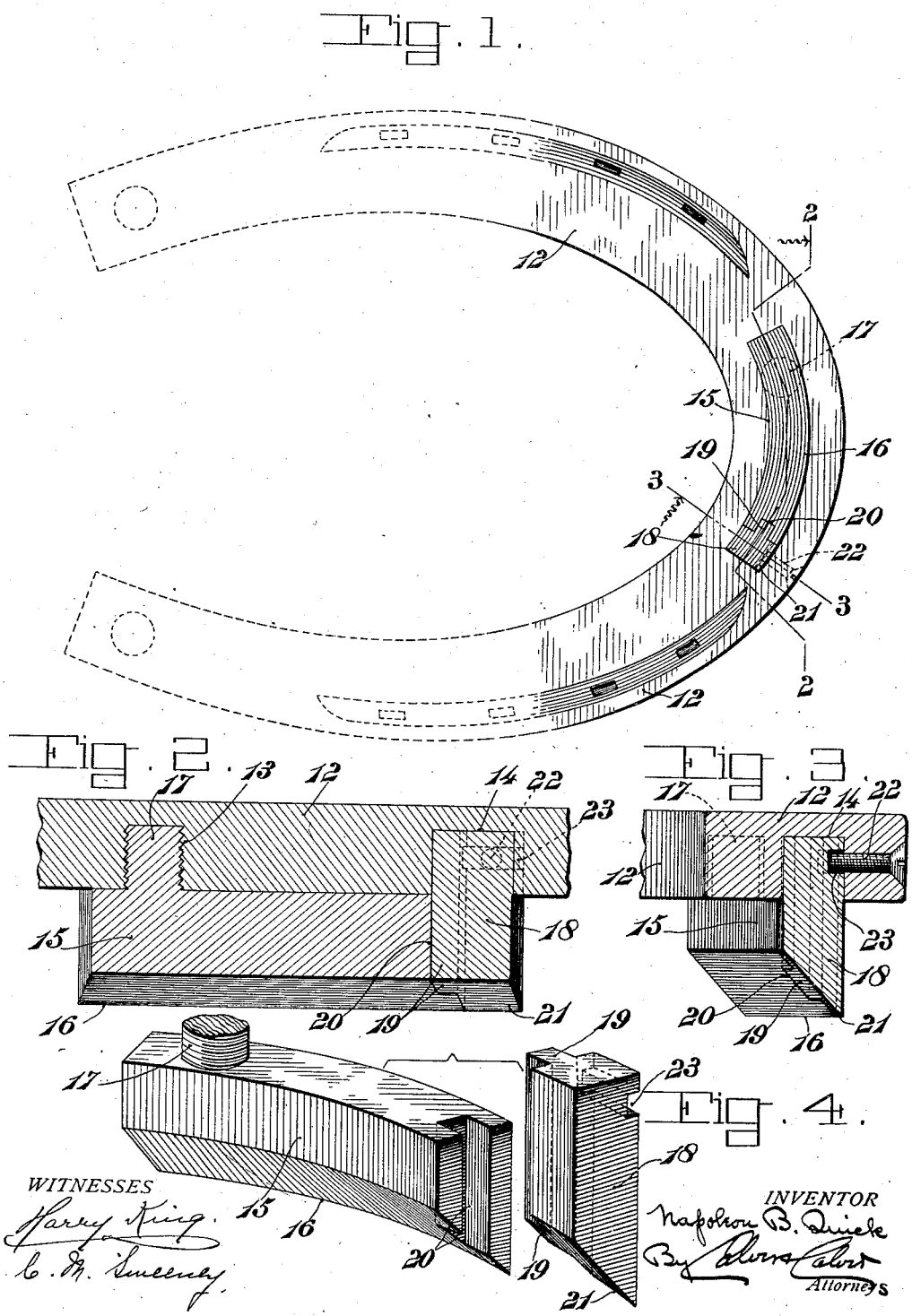

NAPOLEON B. QUICK, OF GLEN SPEY, NEW YORK.

HORSESHOE.

1,079,512.  Specification of Letters Patent.  Patented Nov. 25, 1913.

Application filed November 22, 1912. Serial No. 732,936.

*To all whom it may concern:*

Be it known that I, NAPOLEON B. QUICK, a citizen of the United States, residing at Glen Spey, in the county of Sullivan and State of New York, have invented or discovered certain new and useful Improvements in Horseshoes, of which the following is a specification, reference being had therein to the accompanying drawings.

This invention relates to horseshoe calks of the detachable type and has for its general object to provide a device of this character which will be of simple and inexpensive construction and efficient and durable in use, and which may be easily and quickly applied to or detached from the horseshoe.

This and other objects of the invention, together with means whereby the same may be carried into effect, will best be understood from the following description of one form or embodiment thereof illustrated in the accompanying drawings. It will be understood however that the construction described and shown has been chosen for illustrative purposes merely, and that the invention may be embodied in other forms without departing from the spirit and scope thereof.

In said drawings: Figure 1 is a bottom plan view of a horseshoe with the calk in place thereon. Fig. 2 is an enlarged sectional view on the line 2—2, Fig. 1. Fig. 3 is a section on the line 3—3, Fig 1. Fig. 4 is a perspective view of the parts of the calk detached 12 denotes the horseshoe to which the calk is applied, which horseshoe may be of usual construction but which is prepared for the attachment of the calk by being provided with a threaded opening 13 and with a separate unthreaded and preferably angular opening 14. The calk comprises an elongated body portion 15, having an outer edge 16 of any suitable shape or form according to requirements, and provided adjacent one end with a preferably integral threaded shank 17. As herein shown the body portion 15 is beveled to form a plain or continuous sharpened edge 16, but said edge might be toothed or serrated or of a blunt and roughened form or of any other suitable character familiar to those skilled in the art according to conditions of use. The threaded shank 17 coöperates with the threaded opening 13 in the shoe 12, the initial operation of attaching the calk being to screw said shank into said opening until the base of the body portion 15 is brought into engagement with the surface of the shoe in the position shown in Figs. 1 and 2. Thereafter said body portion is held against turning by means of a key 18 inserted into the opening 14. Said key is preferably of angular form to fit said opening and to engage and fit the end of the body portion 15, being, in the construction shown, provided with a rib 19 entering a groove 20 formed in the end of said body portion opposite the shank 17. The key 18 is of a length greater than the depth of the body portion so as to fill the opening 14 and extend to the outer edge of said body portion, and slides longitudinally in said opening when inserted and removed. The outer end 21 of said key is formed to correspond in shape with the outer edge 16 of said body portion, and when said key is in place lies substantially flush therewith so as to form a continuation thereof. Means are provided for retaining said key in place, said means as shown comprising a set screw 22 entering a tapped opening in the front edge of the horseshoe and engaging a notch 23 in said key. In order to remove the calk the set screw 22 is loosened, the key 18 removed, and the body portion 15 turned to unscrew the shank 17.

As will be seen, the construction is such that ordinary conditions of use will have no tendency to jam or otherwise so affect the parts as to make removal difficult, or to loosen the parts so as to present danger of accidental detachment. It will also be seen that there are no weak or delicate parts subject to wear or strain, so that an extremely secure, durable, and efficient calk is provided, capable however of easy and quick detachment when desired.

Having thus described my invention, I claim:

1. A horseshoe calk comprising a body portion having an angular end, an angular key for said body portion engaging and fitting the end thereof, the outer end of said key being formed to correspond in shape with the outer edge of said body portion and lying substantially flush therewith, and separate means for retaining said key in place.

2. A horseshoe calk comprising an elongated body portion having an angular end and a threaded shank adjacent the opposite end, an angular, longitudinally sliding key fitting and engaging the angular end of said body portion to hold the same against turning, said key being of greater length than the depth of said body portion and extending to the outer edge thereof, and separate means for holding said key in place.

3. The combination with a horseshoe having a threaded opening and a separate unthreaded opening, of a calk comprising a body portion having an angular end and having adjacent the opposite end a threaded shank coöperating with said threaded opening, an angular key in said unthreaded opening and engaging the opposite end of said body portion to hold the same against turning, said key having a notch in its lateral face, and a set screw entering the edge of said horseshoe and engaging said notch to retain said key in place.

In testimony whereof I affix my signature, in presence of two witnesses.

NAPOLEON B. QUICK.

Witnesses:
HEBER S. DUNN,
EDITH DUNN.

Copies of this patent may be obtained for five cents each, by addressing the "Commissioner of Patents, Washington, D. C."